(12) United States Patent
Rodero Antunez

(10) Patent No.: US 6,951,673 B2
(45) Date of Patent: Oct. 4, 2005

(54) MINERAL WOOL ELEMENT WITH ENHANCED REACTION TO FIRE, AIR DUCT COMPRISING THE SAME

(75) Inventor: Carlos Rodero Antunez, Madrid (ES)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 10/433,081

(22) PCT Filed: Nov. 30, 2001

(86) PCT No.: PCT/FR01/03795

§ 371 (c)(1),
(2), (4) Date: May 30, 2003

(87) PCT Pub. No.: WO02/44096

PCT Pub. Date: Jun. 6, 2002

(65) Prior Publication Data

US 2004/0050444 A1 Mar. 18, 2004

(30) Foreign Application Priority Data

Dec. 1, 2000 (ES) .......................................... 200002889

(51) Int. Cl.⁷ ......................... B29D 22/00; B29D 23/00; B32B 1/00
(52) U.S. Cl. ......................... 428/34.5; 428/74; 428/49; 428/36.1; 428/313.7; 428/332; 428/220; 428/426; 428/921; 138/177; 52/720.1
(58) Field of Search ................................ 52/720.1, 750; 138/177; 428/49, 48, 74, 220, 34.4, 34.5, 35.7, 36.3, 36.4, 36.9, 36.92, 304.4, 313.5, 313.7, 332, 426, 437, 921

(56) References Cited

U.S. PATENT DOCUMENTS

| 4,584,214 A | * | 4/1986 | Eiermann .................. 428/34.5 |
| 4,759,974 A | * | 7/1988 | Barthe et al. ............... 442/400 |
| 5,728,187 A | | 3/1998 | Kern et al. |

FOREIGN PATENT DOCUMENTS

| FR | 2 682 403 | 4/1993 |
| FR | 2 750 978 | 1/1998 |

* cited by examiner

Primary Examiner—Michael C. Miggins
(74) Attorney, Agent, or Firm—Oblon, Spivak, McClelland, Maier & Neustadt, P.C.

(57) ABSTRACT

An element essentially consisting of mineral wool exhibits an enhanced reaction to fire. Such an element is especially in the form of a panel and is used for the construction of air ducts. The panels comprise a glass wool core, said core being formed from glass fibers which act as components of the wool. The glass fibers of the element according to the invention have a diameter substantially greater than the diameter of the glass fibers which are presently used for the manufacture of panels or of ducts for similar applications. The glass fibers used according to the invention have a fineness index with a value which fluctuates between 5.8±0.5 for 6 grams. The invention also relates to a process for manufacturing an air duct from said panels.

12 Claims, No Drawings

MINERAL WOOL ELEMENT WITH ENHANCED REACTION TO FIRE, AIR DUCT COMPRISING THE SAME

The present specification refers to a patent application relating to an element essentially consisting of mineral wool which exhibits an enhanced reaction to fire. Such an element is especially in the form of a panel and is used for the construction of air ducts. The panels comprise a glass wool core, said core being formed from glass fibers which act as components of the wool. The glass fibers of the element according to the invention have a diameter substantially greater than the diameter of the glass fibers which are presently used for the manufacture of panels or of ducts for similar applications. The glass fibers used according to the invention have a fineness index with a value which fluctuates between 5.8±0.5 for 6 grams. The invention also relates to a process for manufacturing an air duct from said panels.

The invention applies to the industry specializing in the manufacture and the conversion of glass as well as mineral wool and similar products. It is particularly aimed at uses in the air-conditioning field in which air ducts, especially ducts comprising thermal insulation means, are widely used.

The applicant is aware of the current use, for manufacturing air ducts, of elements consisting essentially of glass fibers which constitute a mineral wool, the fibers of which have a fineness index lying between 4±0.4 for 5 grams. To obtain a quality product from such fibers it is necessary to apply a finish of more than 10% by weight. Such an element leads to a poor reaction-to-fire classification of the air ducts which comprise it. The expression "fineness index" is understood to mean the value obtained by measuring the head loss of a gas flowing through a specimen consisting of fibers to be characterized. This measurement gives an indication about the average diameter of the fibers and is usually known as the "micronaire measurement". This measurement is described in the ASTM D1448 standard (and in DIN 53941). This measurement was initially developed to characterize cotton fibers and has for a long time been used in the mineral fiber industry to characterize glass fibers. The "fineness index" is defined by the reading on the micronaire instrument for a given mass of product.

In the case of the fibers used according to the invention, it should be understood that a micronaire reading of 5.8±0.5 is measured when the quantity of fibers corresponding to a mass of 6 grams is introduced into the measurement cell of the micronaire instrument.

To give an order of magnitude, it may be stated that a fineness index of 4±0.4 for 5 grams corresponds to the characterization of glass fibers with a mean diameter of about 3.5 to 4 $\mu$m, a fineness index of 5±0.5 for 6 grams corresponds to the characterization of glass fibers whose mean diameter is about 9 $\mu$m and a fineness index of 6±0.5 for 6 grams corresponds to the characterization of glass fibers whose mean diameter is about 12 $\mu$m.

To meet the reaction-to-fire standards in force, it would be desirable to substantially reduce the content of finish which is incorporated into the mineral wool, that is to say the material which creates adhesion between the fibers. Tests have shown that finish contents within a range lying between 5% and 6% (of the total mass of the fibrous product including the finish) make it possible to meet the standards in force. However, it is not possible to use such finish contents with the fibers known for such applications since it would result in an unacceptable reduction in the quality of the product.

The applicant is therefore unaware of the existence at the present time of mineral wool ducts containing glass fibers which meet the reaction-to-fire standards in force.

The element essentially consisting of glass wool with enhanced reaction to fire proposed by the invention is novel per se by having, within the context of its application, glass fibers, especially of the type based on silicon, sodium, boron and calcium, with a diameter substantially greater than that used in the fibers used at the present time. Surprisingly, it has been found experimentally that glass fibers, most particularly those which have a fineness index lying between 5.8±0.5 for 6 grams, make it possible to obtain elements intended to be formed into panels which exhibit good usage properties, even when the finish content is greatly reduced, especially when between 5 and 6% of finish is used. It then becomes possible to obtain a glass-wool-based element capable of having an improved reaction to fire and of meeting the standards in force. Panels for the manufacture of air ducts may be formed from such an element.

The structure of these panels is especially of the type of panels known by the brand name CLIMAVER or CLIMAVER PLUS (sold for example by Isover). Rigid panels, such as those described in patent application FR 2 786 550, may for example be manufactured from elements according to the invention.

Specifically, a mineral fiber duct with enhanced reaction to fire is made from a panel intended for the construction of air ducts, said panel consisting of a glass wool core which has a glass fiber diameter substantially greater than that of the products employed at the present time, defined by a fineness index which fluctuates between 5.8±0.5 for 6 grams and in which the amount of finish incorporated into these fibers lies within the 5% to 6% range. According to a preferred embodiment, the finish is a binder obtained from a phenol-formaldehyde resin.

The mineral wool duct with enhanced reaction to fire suggested consists of a panel for the manufacture of air ducts composed of a glass wool core having a fineness index which fluctuates in 5.8±0.5 for 6 grams and a finish, especially adhesive, content of between 5% and 6%.

Preferably, the finish is a binder obtained from a phenol-formaldehyde resin.

To produce such a mineral wool duct, it is especially possible to use sections such as those described in patent application EP 0 791 791.

The invention also relates to a process for manufacturing an air duct, especially a heating and/or air-conditioning duct; said process includes a step in which the panels defined above are assembled.

What is claimed is:

1. An element comprising a mineral wool core to which an adhesive is added, wherein the mineral wool core comprises glass fibers which have a fineness index of 5.8±0.5 for 6 grams and the adhesive is present in an amount within a weight range of 5% and 6% based on the weight of the element.

2. The element as claimed in claim 1, wherein the adhesive is a binder obtained from a phenol-formaldehyde resin.

3. The element of claim 1, wherein the glass fibers are based on silicon, sodium, boron and calcium.

4. The element as claimed in claim 1, which is in the form of a panel.

5. The element as claimed in claim 4, wherein the adhesive is a binder prepared from a phenol-formaldehyde resin.

6. An air duct comprising elements in the form of panels according to claim 5.

7. A process for manufacturing an air duct, comprising assembling the elements in the form of panels according to claim 5.

8. An air duct comprising elements in the form of panels according to claim 4.

9. The air duct of claim 8, which is adapted for air-conditioning and/or heating.

10. A process for manufacturing an air duct, comprising assembling the elements in the form of panels according to claim 4.

11. The process for manufacturing an air duct of claim 10, which is adapted for air-conditioning and/or heating.

12. The element of claim 4, wherein the glass fibers are based on silicon, sodium, boron and calcium.

* * * * *